United States Patent [19]

Clark et al.

[11] Patent Number: 5,257,375
[45] Date of Patent: Oct. 26, 1993

[54] METHOD AND APPARATUS FOR DISPATCHING TASKS REQUIRING SHORT-DURATION PROCESSOR AFFINITY

[75] Inventors: Carl E. Clark, Poughkeepsie; Jeffrey A. Frey, Highland, both of N.Y.

[73] Assignee: International Business Machines Corp., Armonk, N.Y.

[21] Appl. No.: 749,069

[22] Filed: Aug. 23, 1991

[51] Int. Cl.$^5$ .................... G06F 15/16; G06F 12/00
[52] U.S. Cl. .................... 395/650; 395/700; 364/280; 364/281.3
[58] Field of Search ............ 395/275, 500, 425, 375, 395/775, 800, 700, 650

[56] References Cited

U.S. PATENT DOCUMENTS

| | | | |
|---|---|---|---|
| 4,638,427 | 1/1987 | Martin | 395/500 |
| 4,843,541 | 6/1989 | Bean et al. | 395/275 |
| 5,193,172 | 3/1993 | Arai et al. | 395/425 |

*Primary Examiner*—Kevin A. Kriess
*Assistant Examiner*—Kevin Spivak
*Attorney, Agent, or Firm*—William B. Porter; Peter L. Michaelson

[57] ABSTRACT

An application, executing on a first processing element in a MP system without an asymmetric feature, issues an instruction requiring that feature to complete. A program check interruption gives control to interrupt handlers, which create a high-priority, non-preemptable work unit control block and enters the dispatcher to enqueue the work unit on a processor-related queue associated with a second processing element having the asymmetric feature. When the dispatcher executes in the second processing element, it executes the non-preemptable work unit, which transfers control to the application at the point of interruption. Subsequently the application has only whatever processor affinity obtained prior to the program check.

11 Claims, 7 Drawing Sheets

METHOD AND APPARATUS FOR DISPATCHING TASKS REQUIRING SHORT-DURATION PROCESSOR AFFINITY

BACKGROUND OF THE INVENTION

1. Field of the Invention

This invention relates to the field of multiprocessing systems having two or more processing elements. More specifically, it relates to mechanisms for providing processor affinity to a task requiring a feature installed on fewer than all processors in a processor complex.

2. Background Art

In tightly coupled multiprocessor systems, comprising two or more processing elements, a user program may execute for an interval on a first processing element, then be interrupted, or suspended (perhaps to await I/O completion), and subsequently be redispatched on another processing element. In a symmetric process complex each processing element has identical features, so that a task may normally be dispatched on whatever processing element is desired to accommodate system-wide goals (e.g., load balancing). However, in an asymmetric complex, a feature available on one processing element may not exist on another processing element.

An early solution to this problem on operating systems such as IBM's MVS/SP was to introduce the concept of task affinity. Using a "program properties table", it was possible to identify a program as having affinity to (or needing to be run on) a particular processing element of the complex, where a needed feature was known to exist. A disadvantage of this approach is that the program is restricted to a particular processing element for its entire execution, while it is possible that the asymmetric feature may only be needed for a short while. In this event, the affinity may prove unnecessarily restrictive (e.g., a processing element may be idle while the program (possibly no longer needing the asymmetric feature) waits for an element having the feature - which element may be out of service.)

A refinement to the "permanent" affinity of the program properties table is described in U.S. Pat. No. 4,809,157 to J. H. Eilert, et al. (issued Feb. 28, 1989 and assigned to the assignee of the present invention). Here a more limited affinity, termed "vector affinity", is described. With vector affinity, a program can execute without affinity to a particular processing element until a need for an asymmetric feature is demonstrated by executing a special instruction requiring the feature. Execution of the special instruction on a processing element without the feature results in an interruption of the program, and a redispatch of the program on the processing element having the feature. The program will now have restrictive affinity until it goes without needing the feature for a fixed time interval—after which a separate routine removes the affinity.

A number of problems remain even in this vector affinity situation. First, it is possible that a program having affinity to a particular processing element may remain enqueued while the needed processing element executes a program which could just as well have run on another processing element. This could result in unnecessary system underutilization. Second, vector affinity requires an overt act to remove the restrictive affinity. This may be wasteful in a case where the affinity is only needed to execute a single instruction.

A related invention, "Process for Dispatching Tasks Among Multiple Information Processors", is described in U.S. Pat. application Ser. No. 07/531,178, by J. E. Bahr, et al., filed May 31, 1990, and assigned to the assignee of the present invention, describes a technique in which a centralized allocation routine scans ready work a number of times, picking work with an affinity to a particular processing element ahead of work without such an affinity, and analyzing work priority in making the assignments. This solution relies on having a centralized routine making the work allocation, whereas an MP environment such as IBM's MVS/ESA supports a dispatcher executing on any processing element—more than one possibly executing in parallel—selecting work from a central queue. The just referenced application is similar to the vector affinity invention in requiring an overt act (executing a reset instruction) to remove the affinity.

Therefore it is an object of the present invention to provide a transient affinity for a program to a particular processing element, with the transient (short-duration) affinity vanishing without a trace after the redispatch of the program on the appropriate processing element.

It is a further object of this invention to provide a transient affinity mechanism that will provide a reduced likelihood that work having this affinity will be unnecessarily delayed by work not having an affinity for the processing element.

It is a further object of this invention to provide an efficient means for quickly redispatching a work unit with transient affinity on an appropriate processor.

It is a further object of this invention to provide an efficient means for dispatching work units requiring an asymmetric feature on the processor having that feature, without interrogation by other processors, and without adverse impact to other work units in the same address space that do not require the feature.

SUMMARY OF THE INVENTION

To achieve these and other objects, this invention provides a mechanism for efficiently redispatching a task from a first processor (lacking a required resource) to a second processor (with the required resource), without requiring that the task continue to execute on the second processor after its initial dispatch there. The MVS embodiment is to create a set of processor-related dispatcher queues, which are scanned early by a dispatcher executing in a processor ready for work. When a task is interrupted by a program check because a resource required to execute the instruction is not on that processor, the interrupt handling mechanism suspends the task, making it ineligible to be dispatched, and enqueues an SRB on the processor-related queue for a processor having the required resource. The processor having the resource then resumes processing of the interrupted task via the SRB RESUME mechanism (at the point of interruption) on a subsequent scan for work.

Because there is no setting of task affinity with this mechanism, there is no need to "unset" affinity—i.e., the task will automatically be dispatchable on any free processor after its next interruption. This characteristic makes the invention suitable for "transient" affinity requirements (e.g., a cryptographic instruction requiring a cryptographic feature). Typically, a task executing a crypto function (encipher/decipher) will not likely execute another such instruction "soon". Therefore, giving the task affinity for the processor having the crypto feature unnecessarily limits the system's load balancing ability, while requiring an overt action ("unsetting" affinity) is wasteful of processing time.)

DESCRIPTION O THE PREFERRED EMBODIMENT

Figure 1:
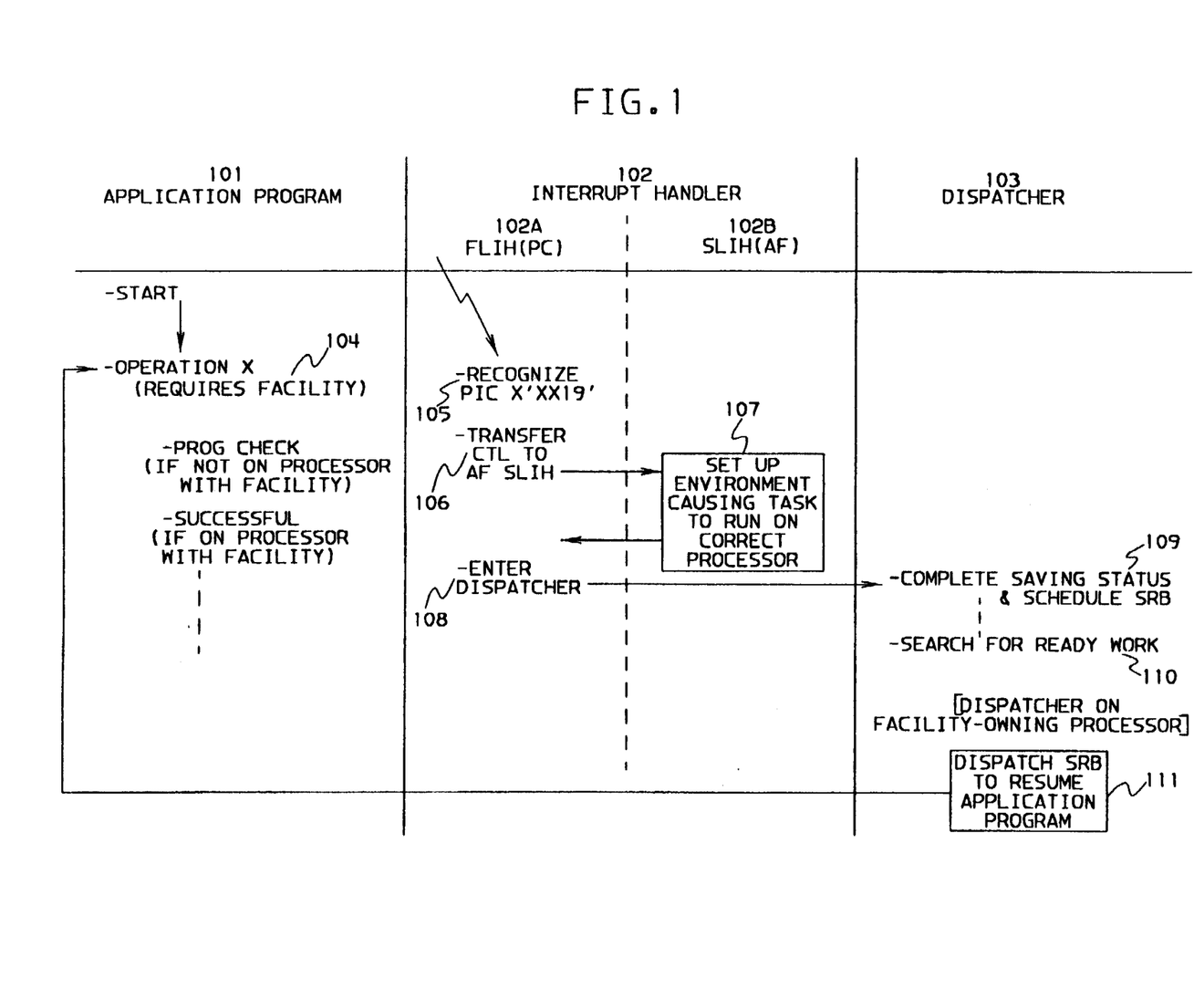
FIG. 1 is a control flow diagram illustrating control flow among an application program, first and second level interrupt handlers, and dispatcher, with the present invention.

FIG. 1 gives an overview of the control flow among major components implementing the present invention in its preferred embodiment on a multiprocessing operating system, IBM's MVS/ESA. The first column 101 shows control flow within an application program which requires an asymmetric facility (not available on the processing element on which it is initially dispatched) at a point in its processing; the second column 102 shows control flow within the first level interrupt handler (FLIH) 102A, and second level interrupt handler (SLIH) 102B; the third column 103 shows control within the dispatcher 103.

Figure 3:
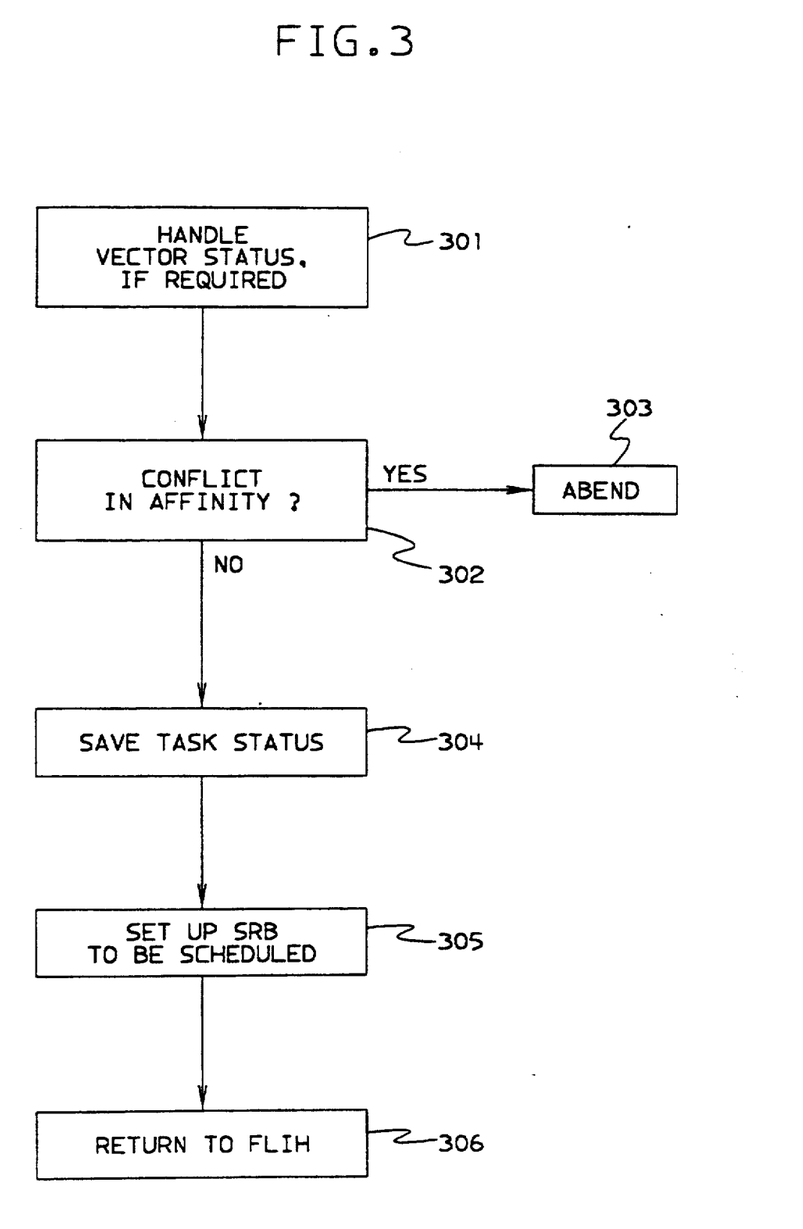
FIG. 3 is a flowchart showing control flow in the Asymmetric Feature Second-Level Interrupt Handler (AF SLIH) in the present invention.
Figure 4:
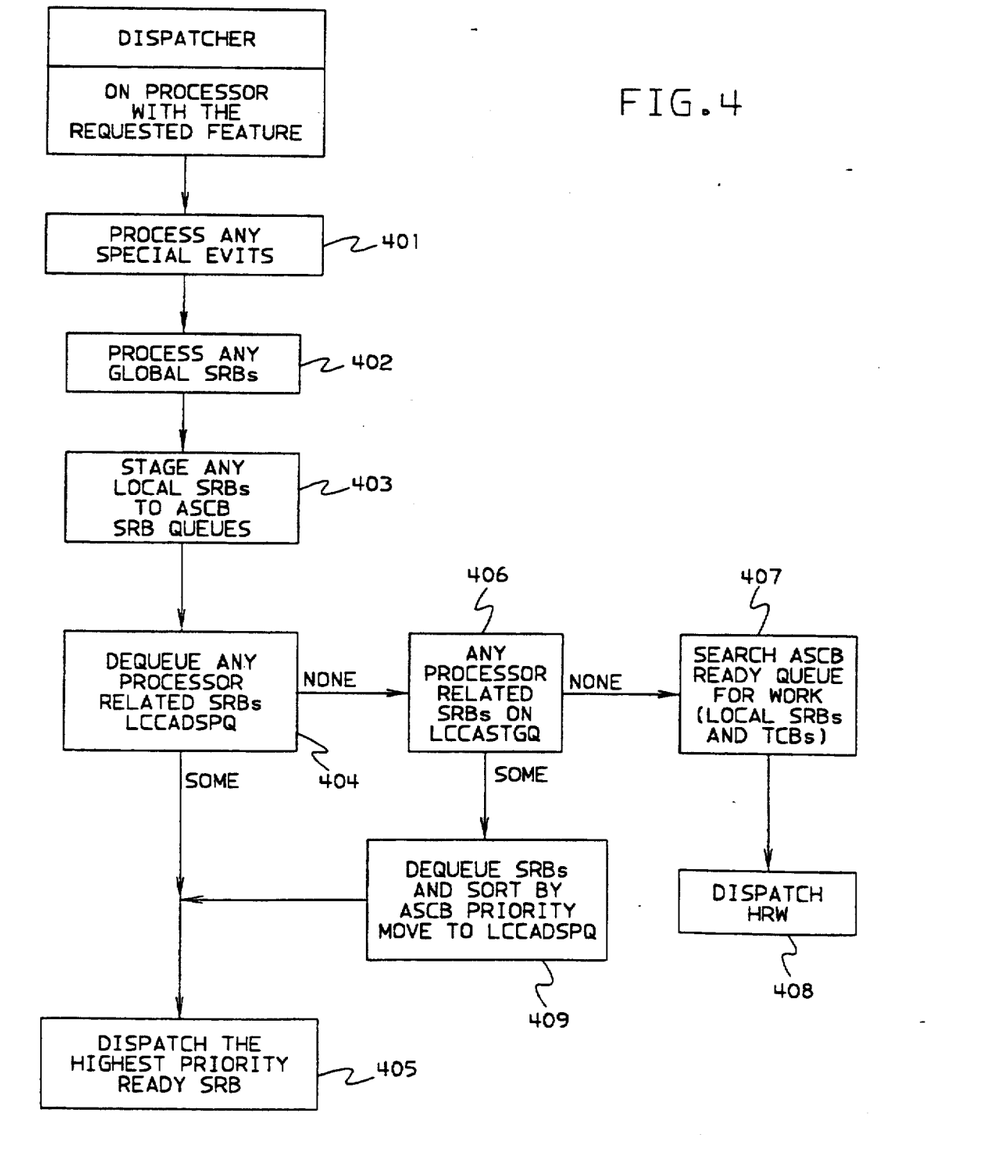
FIG. 4 is a flowchart showing control flow in the dispatcher of the present invention.
Figure 5:
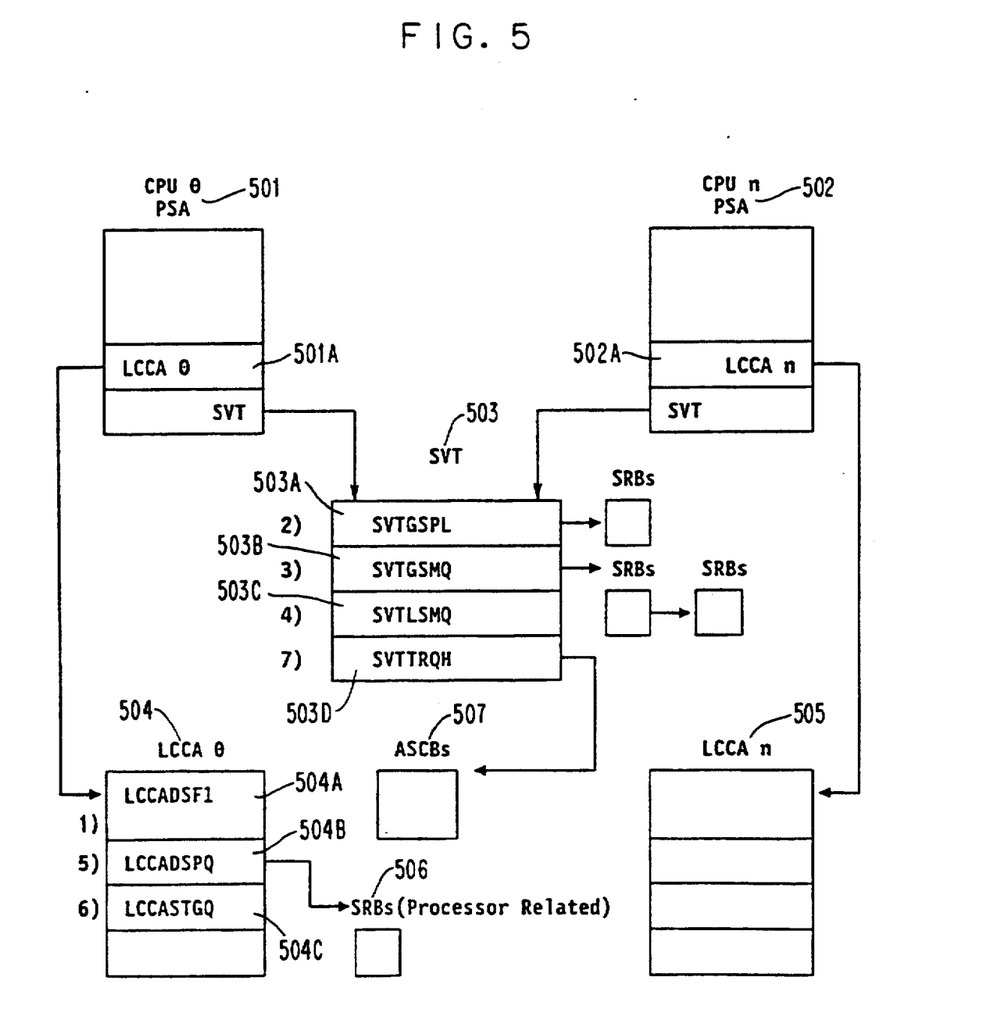
FIG. 5 is a control block diagram showing key control blocks accessed by the dispatcher searching for ready work in the present invention.

After its initial dispatch, the application program (task) processes until execution of operation X (104) (for example, a cryptographic operation requiring a cryptographic feature to complete). When the facility on the processor is not available, a program check is conventionally presented. (Here, the program check is hex code X'0119', for example). Conventionally, the program check FLIH receives control (by the hardware conventionally loading the Program Check New PSW as part of interrupt processing), the interrupt handler recognizes the X'0119' code (105), and transfers control (106) to the (new) SLIH associated with the "asymmetric feature" interrupt. The SLIH performs processing necessary to ensure that the task will be redispatched on the proper processing element—one with the asymmetric feature installed (107). Details of this processing are shown in FIG. 3, and described below. The SLIH returns to the FLIH, which enters the dispatcher (103). The dispatcher completes the status saving (109) on the TCB/RB (FIG. 2A & 2B at 201,202) (begun in the SLIH), and then schedules the SRB located by STCBASRB (FIG. 2B at 203), and performs other processing as in the prior art and then searches for ready work for the current processing element (110). When the dispatcher executes on a processor having the asymmetric feature, it dispatches the SRB which resumes the task at the point of interruption (111). This direct redispatch of the interrupted work unit prevents other work in the address space (as well as other address spaces), not needing the asymmetric feature, from being dispatched on the processor having that feature ahead of the work unit that needs it. This processing is shown in FIGS. 4 and 5, and explained below.

Figure 2A:
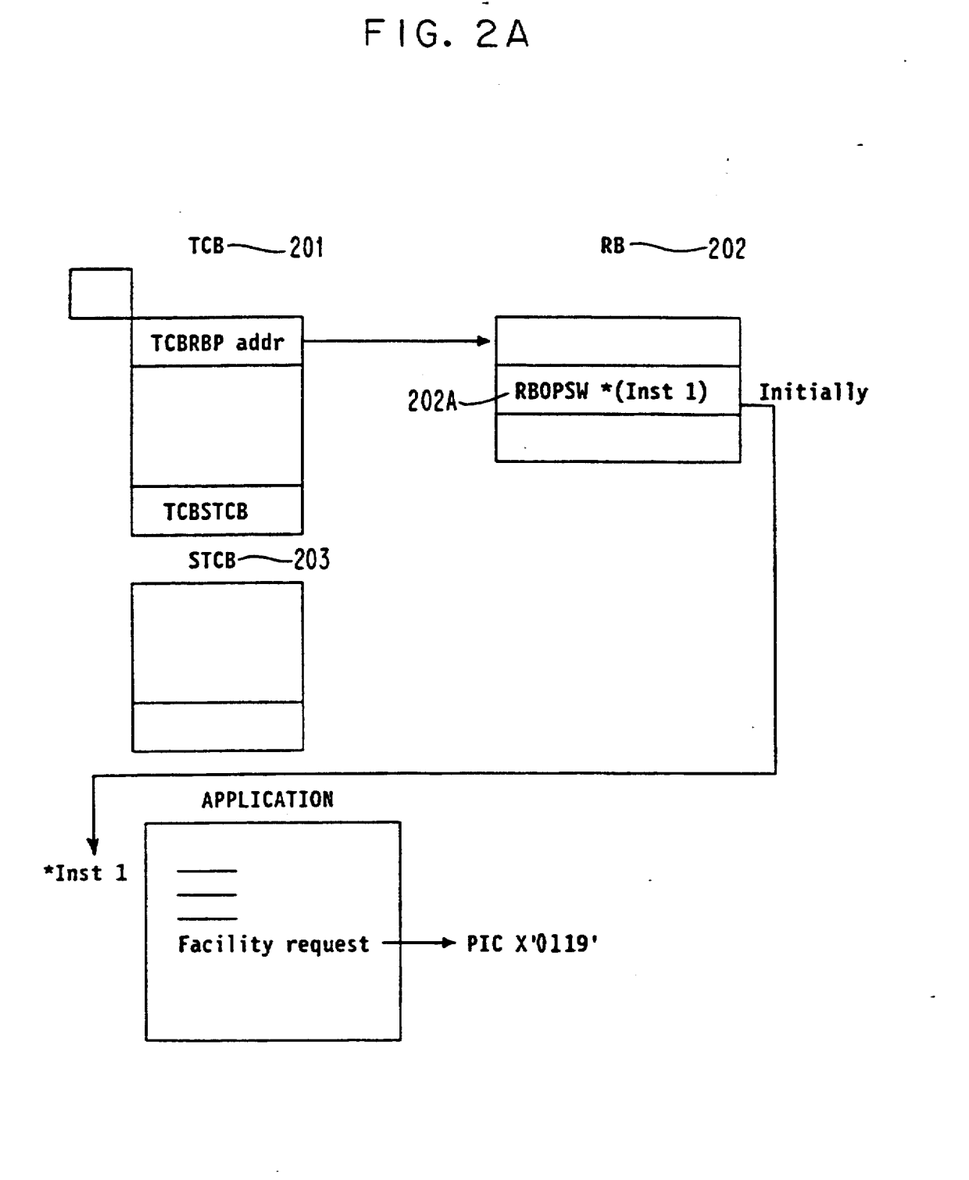
FIGS. 2A and 2B are control block diagrams showing key task-related control block status before and after a program check in the present invention.

FIG. 2A shows the (conventional) control block structure for the application up until the program check. The TCB (201) points to the RB (202), which contains the PSW that contains the application's starting address (RBOPSW - 202A).

FIG. 3 shows control flow for the asymmetric feature SLIH. The illustrated processing is for an unlocked task in MVS: an idiosyncrasy of MVS (unrelated to the essence of the present invention) requires different handling for locked tasks, or SRB's. These differences are discussed below.

Figure 2B:
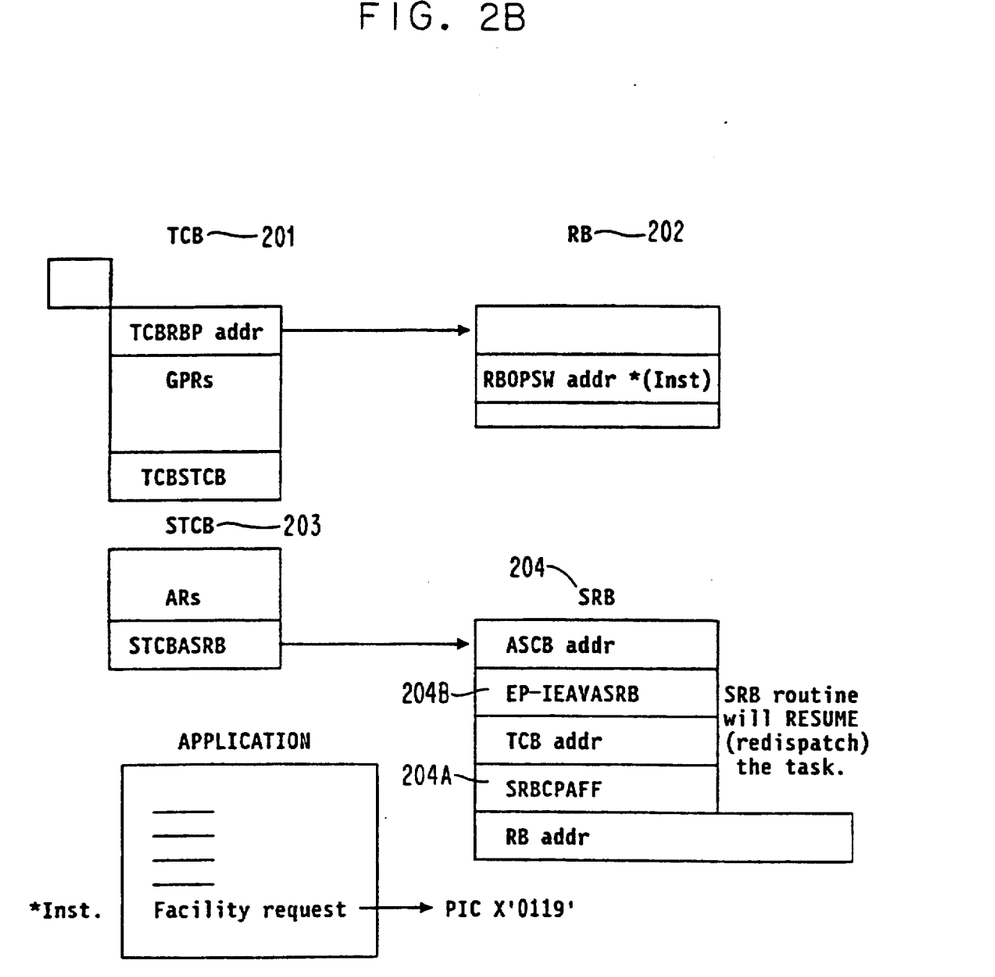
Figure 6:
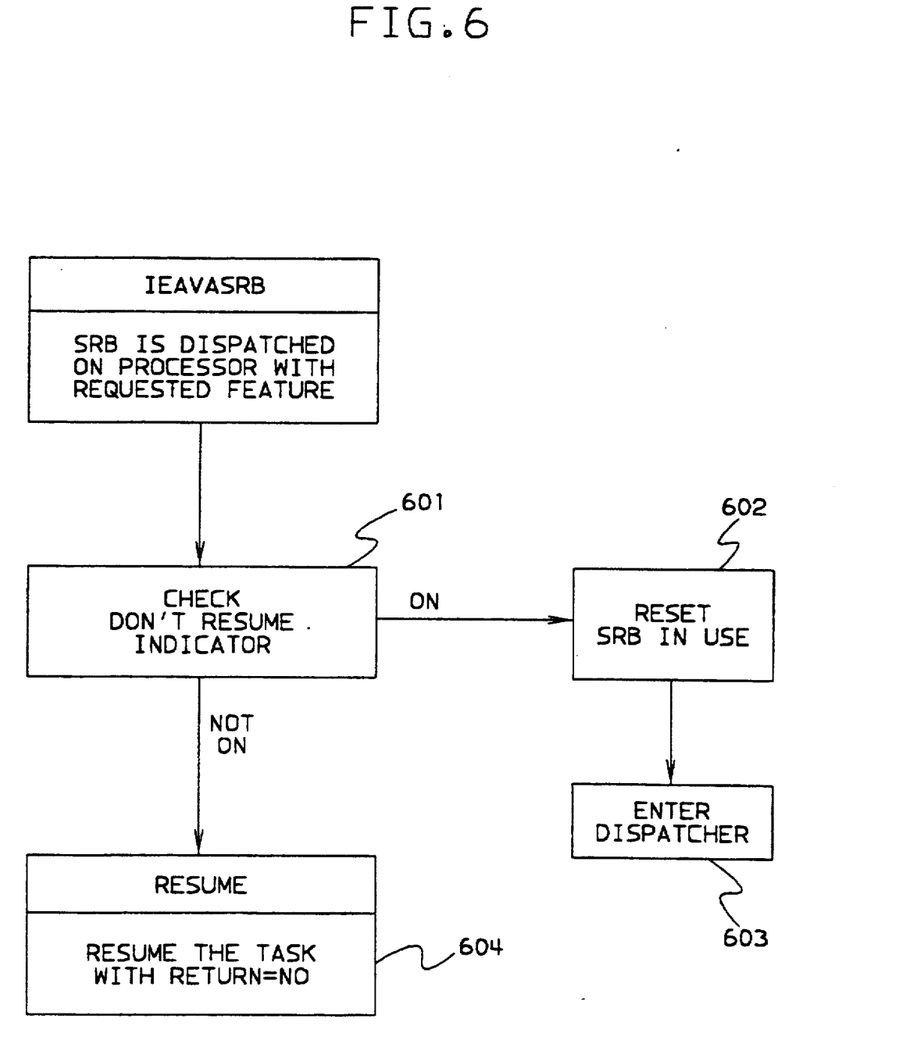
FIG. 6 is a flowchart showing control flow in the SRB routine used in the present invention to resume the application program.

At 301, vector status is saved if required (and vector affinity temporarily removed, so that the task can execute on another processor). At 302 a test is made whether the task has an affinity requirement that prohibits dispatch to a processor having the asymmetric feature. If so, the task is abnormally terminated at 303. If no conflict exists, task status is saved (304) in the TCB/RB (FIGS. 2A,2B at 201,202). An SRB is then obtained and chained (305) to a unique place on the STCB (203). After control is returned to the dispatcher and the task's final status is saved, the SRB is scheduled to the processor queue by placing the SRB either on LCCADSPQ (FIG. 5 at 504B) or the staging queue, LCCASTGQ (FIG. 5 at 504C) if there already are SRB's on the former queue. (FIG. 2B at 204). The SRB is initialized to RESUME the task on a processor having the feature (such processors are identified in the CSD (a well known MVS control block, chained to the CVT), and the mask identifying those processors is placed in the SRB (SRBCPAFF - FIG. 2B at 204A). The SRB also points to the routine (IEAVASRB) that will redispatch the task (FIG. 2B at 204B): control logic for this routine is shown in FIG. 6, and described below. Return is then made to the FLIH (306).

As mentioned, the logic of FIG. 3 handles unlocked tasks (the normal situation). In MVS, if the application was running under an SRB, the SRB would simply be suspended, then rescheduled with a new affinity mask for the required processor (since SRB's run in a non-preemptable mode in MVS, there is little value here for dynamic affinity). If the application was running as a locked task, an overt setting of affinity for the TCB within the SLIH (and unsetting on dispatch) would be required, since the existing transfer of control mechanism cannot dispatch a locked task within MVS.

FIG. 4 shows control flow for the dispatcher, showing how (when running on the processing element having the asymmetric feature) it causes the resumption of the application program by dispatching the previously enqueued SRB. (FIG. 5 shows the major control blocks referenced by the dispatcher during this processing.) At 401, the dispatcher processes any special exits first, as in prior art MVS systems (such as appending requests for CPU clock synchronization). These are located by field LCCADSF1 (FIG. 5 at 504A) within the LCCA for a processor (504) (processor 0 in this example) (pointed to (501A) out of processor 0's PSA (501)). (Note that in FIG. 5, the parenthetical numbers 1 (adjacent LCCADSF1 (504A)) through 7 (adjacent SVTTRQH (503D)) indicate the order of search for work by the dispatcher. Items 1-4, and 7, are old; items 5 (LCCADSPQ (504B)) and 6 (LCCASTGQ (504C)) are new in this invention). Again referring to FIG. 4, "global" SRB's (non-processor related are processed (402) next. These are anchored in fields SVTGSPL and SVTGSMQ (FIG. 5 at 503A and 503B) in the SVT (503), the SVT being anchored in each processor's PSA (501 and 502). Next (FIG. 4 at 403), any local SRB's (identified by SVTLSMQ (FIG. 5 at 503C) are staged to ASCB SRB queues, as in the prior art. At this point the new dispatcher processing comes into play: A test is made (FIG. 4 at 404) whether any processor-related SRB's exist (indicated by field LCCADSPQ (FIG. 5 at 504B) in the processor's (processing element's) LCCA (LCCA0 (504) in FIG. 5). If at least one does exist (506), the highest priority one is dispatched (FIG. 4 at 405). (Priority is conventionally indicated by a field in the ASCB.) This will result in the SRB routine IEAVASRB (pointed to out of the SRB - see FIG. 2B at 204B) being dispatched in the appropriate address space. If LCCADSPQ (504B) did not point to any SRB's, then a test is made (FIG. 4 at 406) whether any to-be-staged SRB's are on LCCASTGQ (FIG. 5 at 504C) (placed on there as shown in the discussion of FIG. 3., step 305). If there are none, the ASCB ready queue (anchored at SVTTRQH (FIG. 5 at 503D)) is searched for work (FIG. 4 at 407) (local SRB's and TCB's), as in the prior art. The highest priority ready work unit is dispatched (408). If there are SRB's to be staged, they are dequeued and sorted by ASCB priority (409), and are moved in priority order moved to LCCADSPQ (FIG. 5 at 504B).

FIG. 6 shows control flow for the IEAVASRB routine (pointed to out of the SRB, as shown in FIG. 2B at 204B). At 601 a test is made of a "don't RESUME" indicator (in the TCB). If "on", (e.g. because the work unit was cancelled since this processing started), the SRB in use is reset so that the SRB will not attempt to RESUME the task, (602) and the dispatcher reentered (603). If "not on", the task is RESUME'd (a known MVS function) with RETURN=NO (604). This results in dispatching the task at the instruction requesting the feature (FIG. 1 at 104). Subsequently, (on the next interrupt) the task will once again be dispatchable at its own priority on any system it is eligible to be dispatched on. (Note=though, as noted, no overt action is required to permit the task to be redispatchable on any processor for which it is otherwise eligible, it is possible for the application to force its own preemption by issuing the known CALLDISP service, triggering a return to the dispatcher. This might be desirable in an environment where the processing element having the feature is likely to be needed by many applications, and an application, once beginning to execute on that processing element, might not quickly relinquish control.)

What is claimed is:

1. A computer implemented method for dispatching a task requiring short affinity for a resource-owning processor in a processor complex comprising the steps of:
    a) issuing an instruction on a first processor by said task, said instruction requiring a resource to complete execution, said resource not being available on said first processor;
    b) suspending execution of said task at a point of interruption after said issuing of said instruction, and enqueueing a task-related control block, associated with said task, on a processor-related queue associated with said resource-owning processor; and
    c) dequeueing said task-related control block from said processor-related queue, and resuming said task on said resource-owning processor at said point of interruption, said task thereafter being freely dispatchable within said processor complex without regard to said resource.

2. The method of claim 1, further comprising the step of: after said resuming of said task on said resource-owning processor, having said task force its own preemption so that it can subsequently be redispatched on another processor.

3. The method of claim 1 in which said resource is a cryptographic feature, and said instruction is a cryptographic instruction.

4. Computer apparatus for dispatching a task requiring short-duration affinity for a resource-owning processor in a processor complex comprising said resource-owning processor having an asymmetric resource and another processor not having said asymmetric resource, said apparatus comprising:
    a) an instruction capable of complete execution by said resource-owning processor, but not capable of complete execution by said another processor;
    b) interrupt means for interrupting a task containing said instruction when said instruction starts to execute on said another processor;
    c) task resumption mean scheduled to a processor-related queue associated with said resource-owning processor, said task resumption means resuming said task at said instruction on said resource-owning processor when said task resumption means is dispatched on said resource-owning processor; and
    d) dispatcher means for selecting and dispatching work units, including said task resumption means, enqueued on said processor-related queue or a global queue, said dispatcher means searching said processor-related queue before searching said global queue.

5. The apparatus of claim 4 further comprising preemption means for allowing said task to force its own preemption.

6. The apparatus of claim 5 in which said asymmetric resource is a cryptographic feature and said instruction means is a cryptographic instruction means.

7. The apparatus of claim 5 in which said task-resumption means is a non-preemptable system request block (SRB).

8. Computer apparatus for dispatching a task requiring short-duration affinity comprising:
    a) a resource-owning processor having an asymmetric resource;
    b) another processor, tightly coupled to said resource-owning processor, said another processor not having said asymmetric resource;
    c) an instruction capable of complete execution by said resource-owning processor, but not capable of complete execution by said another processor;
    d) interrupt means for interrupting a task containing said instruction when said instruction executes on said another processor;
    e) task resumption means, scheduled to a processor-related queue associated with said resource-owning processor, said task resumption means resuming said task at said instruction on said resource-owning processor when said task resumption means is dispatched on said resource-owning processor; and
    f) dispatcher means for selecting and dispatching work units, including said task resumption means, enqueued on said processor-related queue or a global queue, said dispatcher means searching said processor-related queue before searching said global queue.

9. The apparatus of claim 8 further comprising preemption means for allowing said task to force its own preemption.

10. The apparatus of claim 9 in which said asymmetric resource is a cryptographic feature and said instruction means is a cryptographic instruction means.

11. The apparatus of claim 9 in which said task-resumption means is a non-preemptable system request block (SRB).

* * * * *